July 31, 1956
J. R. ORELIND
2,757,020
IMPLEMENT ATTACHING STRUCTURE FOR TRACTORS
Filed Feb. 25, 1953
2 Sheets—Sheet 1
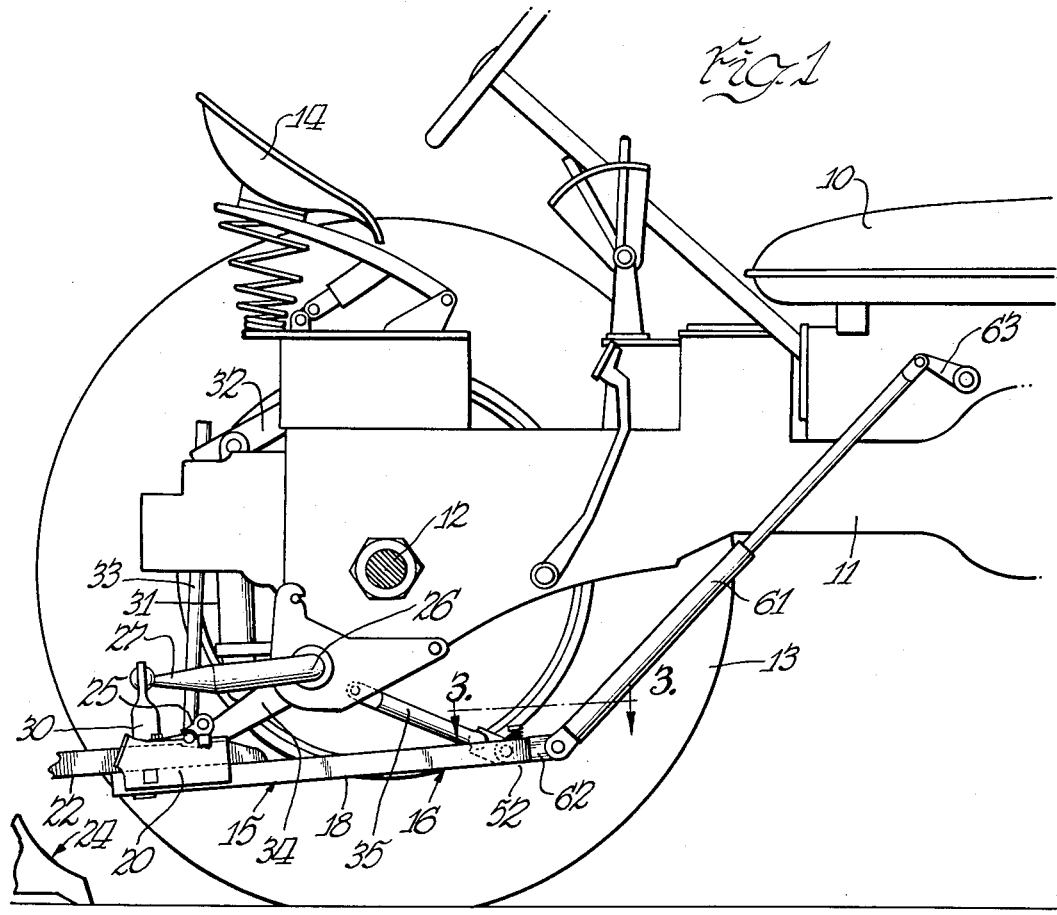
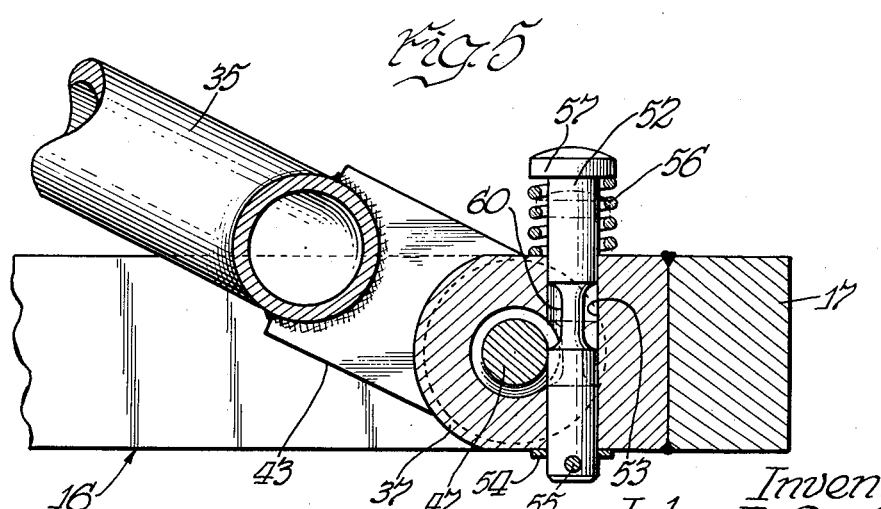
Inventor
John R Orelind
Paul O. Pippel
Atty.

July 31, 1956  J. R. ORELIND  2,757,020
IMPLEMENT ATTACHING STRUCTURE FOR TRACTORS
Filed Feb. 25, 1953  2 Sheets-Sheet 2
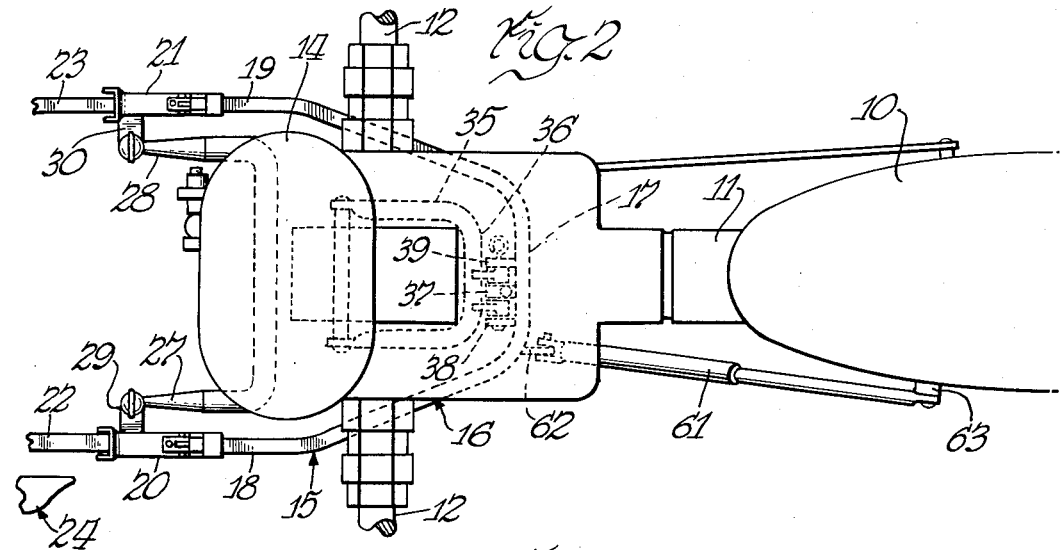
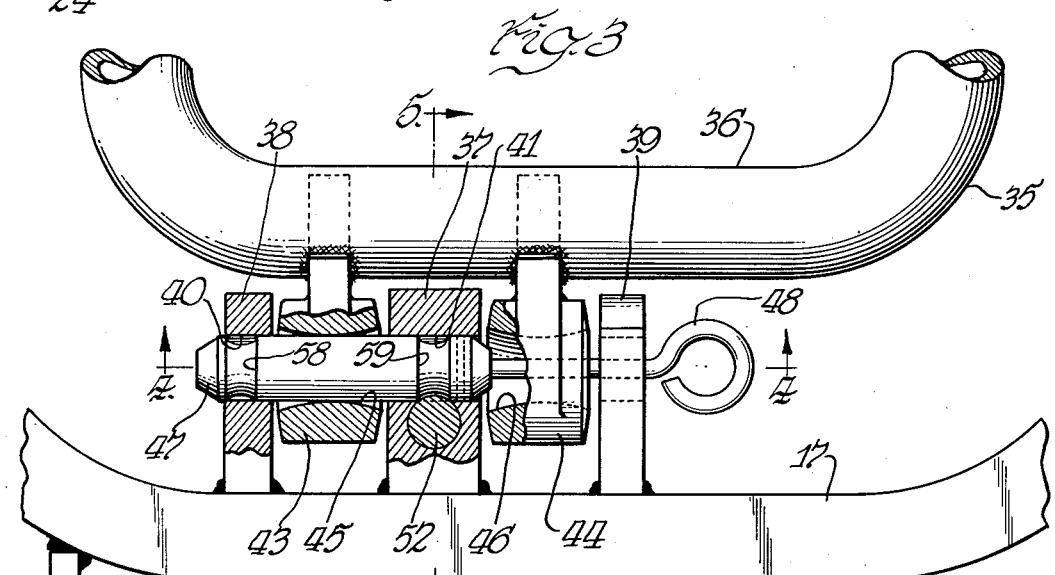
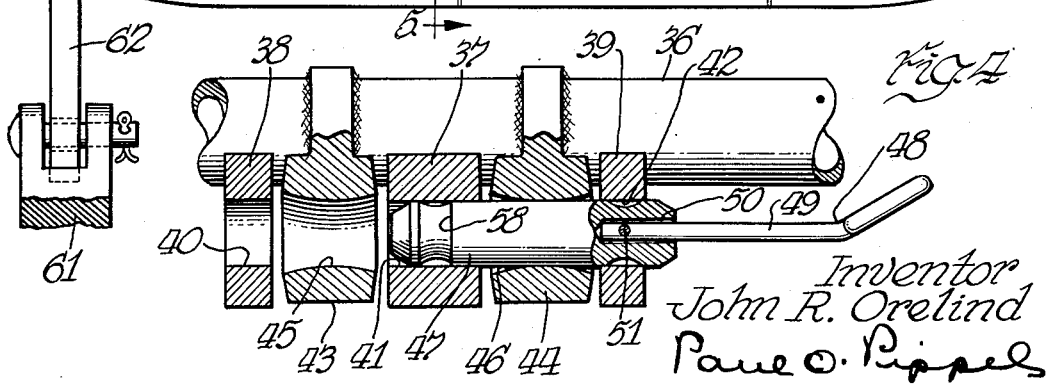
Inventor
John R. Orelind
Paul O. Pippel
Atty.

United States Patent Office 2,757,020
Patented July 31, 1956

2,757,020

IMPLEMENT ATTACHING STRUCTURE FOR TRACTORS

John R. Orelind, Wilmette, Ill., assignor to International Harvester Company, a corporation of New Jersey Application February 25, 1953, Serial No. 338,653

2 Claims. (Cl. 280—504)

This invention relates to implement attaching structures for tractors and particularly to hitch mechanism for adjustably connecting an implement to a draft source.

In an implement such as a moldboard plow the line of draft is a theoretical straight line extending from the center of gravity of the plow unit in operation to the hitch point or point of attachment of the implement to the tractor. The hitch point for an implement mounted at the rear of a tractor usually coincides substantially with a mid-point between the tractor wheels. However, due to side draft affecting an implement such as a moldboard plow, the latter tends to pull to one side of the center line in operation, creating abnormal draft conditions for the tractor. To compensate for this tendency of the plow to move laterally, it is necessary to shift the hitch point, and an important object of this invention is the provision of novel means for connecting an implement to a draft source.

Another object of the invention is the provision of improved hitch mechanism by which the hitch point may be laterally shifted to compensate for side draft on the implement.

Another object of the invention is the provision of novel hitch means including interfitting lugs or projections provided on the hitch and on the draft source, alignable and apertured to receive a hitch pin which provides a draft connection between selected ones of said hitching lugs.

Other objects and advantages of the invention will become clear from the following detailed description when read in conjunction with the accompanying drawings, wherein:

Fig. 1 is a view in side elevation of the rear end of a tractor, partly in section and with one wheel removed, showing an implement attaching structure incorporating the features of this invention;

Fig. 2 is a plan view of the structure shown in Fig. 1;

Fig. 3 is an enlarged detail of the hitching apparatus of this invention.

Fig. 4 is a section taken on line 4—4 of Fig. 3, and

Fig. 5 is a section of the hitch structure taken on the line 5—5 of Fig. 4 and showing the manner in which the hitch pin is locked in a selected position.

Referring to the drawings, the numeral 10 designates the body of a tractor having a power plant 11, a rear axle 12, rear drive wheels 13, only one of which is shown, and an operator's station 14.

The hitch mechanism with which this invention is particularly concerned forms part of an implement attaching structure generally designated by the numeral 15. This implement attaching structure has been fully described in a copending United States application Serial No. 338,651, filed February 25, 1953. It may be noted, however, that the structure 15 includes a U-shaped drawbar 16 extending under the tractor body and forwardly of the rear axle 12 and having a transverse portion 17 and laterally spaced, rearwardly extending arms 18 and 19. These arms are provided at their ends respectively with socket members 20 and 21 adapted to receive for sliding movement therein forwardly projecting rigid shaft members 22 and 23 forming a part of the implement in the shape of a moldboard plow generally designated at 24. Each of the socket members is provided with a latch 25 for locking the associated member 22 or 23 in the socket members 20 and 21.

Raising and lowering of the hitch mechanism 15 is accomplished by lift mechanism, also described in the copending application above mentioned, and including a transverse rock shaft 26 mounted upon the tractor and having rearwardly extending lift arms 27 and 28. The arms 27 and 28 are connected by linkage 29 and 30 to the ends of the arms 18 and 19.

A ram unit 31 pivotally mounted upon the tractor is connected to a pivoted arm 32 likewise mounted on the tractor and having a pivoted connection with the upper end of a rod 33, the lower end of which is connected with a rock arm 34 mounted upon the shaft 26.

Upon receipt of the members 22 and 23 in the respective socket members 20 and 21 the implement 24 is rigidly held by the hitch structure 15 and becomes integral therewith for connection to the tractor in draft receiving relation. The draft connection with the tractor is made through the intermediary of a U-shaped draft member 35 which is pivotally mounted upon the tractor and extends forwardly therefrom. The member 35 has a transverse forward portion 36 parallel to the transverse portion 17 of the drawbar 16.

The transverse portion 17 of the drawbar is provided with a rearwardly extending projection in the form of a boss or lug 37 flanked by a pair of horizontally aligned projections or lugs 38 and 39. Lug 38 is provided with a transverse opening 40 in registry with an opening 41 in the central lug 37 and an opening 42 in the lug 39.

Projections 37, 38 and 39 interfit with a pair of laterally spaced forwardly extending projections or lugs 43 and 44 affixed, as by welding, to the transverse portion 36 of the draft member 35. The lug 43 is received in the space between the projections 37 and 38 and the lug 44 is received in the space between the projections 37 and 39, the width of the lugs 43 and 44 being less than the spaces between the respective lugs on the drawbar 16 in which they are received to allow some play therebetween. The lugs 43 and 44 are provided, respectively, with openings 45 and 46, respectively, and upon alignment of both sets of lugs on the members 35 and 16, their respective openings are in registry.

As pointed out before, the line of draft on a plow is a theoretical straight line extending from the plow to its hitch point on the tractor. Where side draft on the implement is not a substantial factor, the implement is usually connected approximately at a mid-point between the tractor drive wheels. This mid-point is provided by the connection of the lug 44 with the implement hitch between the lugs 37 and 39 thereof. Such a connection is shown in Fig. 4 and is provided by a draft pin 47, the length of which is approximately the span of the central lug 37 and one of the flanking lugs 38 or 39.

In Fig. 4 the pin is shown as extending between the lugs 37 and 39 and is received in the openings in these lugs and extends through the opening 46 in the lug 44 therebetween. When an implement such as the moldboard plow indicated at 24 is attached to the tractor, compensation may be made for the side draft on the implement by a lateral shift in the implement hitch point. By the mechanism of this invention the shift in hitch point is accomplished easily and quickly by the operator grasping the handle 48 having a small diameter shank 49 received in an opening 50 in one end of the pin 47 and pivotally and loosely mounted therein at 51. By grasping the handle 48 the operator simply moves the pin 47 axially in the openings in the transversely aligned lugs until the pin is in the position indicated in Fig. 3 between the lugs 37 and 38 and providing a connection with the lug 43.

The pin 47 is held against axial displacement relative to the lugs and held in the selected position by means of a pin 52 which extends vertically perpendicular to the pin 47 and tangentially thereto, and is slidably received in an opening 53 provided in the lug 37. The pin 52 is held against displacement by a collar 54 and a cotter key 55. A spring 56 surrounds the projecting portion of the pin 56 and engages the lug 37 at one end and a cap 57 at the other. The shank of the pin 52 is receivable in one of the grooves 58 or 59 at opposite ends of the pin 47, depending upon its position relative to the hitch lugs. This position of the pin in the groove 59 is indicated in Figs. 3 and 5, locking the pin 47 against withdrawal. Withdrawal of the pin 47 or insertion thereof to another position is effected by pressing the pin 52 downwardly against the action of the spring 56 until a portion 60 of the pin 52 of restricted diameter is in line with the pin, permitting axial movement of the pin 47.

The forward end of the drawbar 16 is held in a vertically adjusted position by means including a rod 61 pivotally connected at its lower end to a lug 62 affixed to the drawbar 16 and the upper end of which is connected to a rock arm 63 mounted upon the tractor body and rocked in any suitable manner by power derived from the tractor power plant. The forward end of the drawbar may thus be held in a selected adjusted vertical position or may be vertically moved to vary the operating depth of the implement.

Lateral swinging of the drawbar 16 and of the implement relative to the draft member 35 and the tractor is facilitated by the beveling or outward flaring of the ends of the openings 45 and 46 in the lugs 43 and 44.

The operation of the adjustable hitch mechanism of this invention should be clearly understood from the foregoing description. It should likewise be understood, however, that modifications may be made in the invention without departing from the spirit thereof or the scope of the appended claims.

What is claimed is:

1. Apparatus for connecting an implement hitch structure to a tractor having an attaching structure, comprising a lug on one of said structures flanked by a pair of lugs spaced from the central lug, all of said lugs having openings in horizontal alignment transversely of the tractor, a pair of complementary lugs on the other of said structures having openings in transverse alignment and receivable, respectively, in the spaces between said central and flanking lugs with the openings in both sets of lugs in transverse alignment, a pivot pin receivable in said openings, said pin having an effective length substantially equal only to the span of the central lug and one of its flanking lugs and being optionally positionable in the openings in said central lug, one of said complementary lugs, and one of said flanking lugs, whereby draft connection may be made selectively between the pin and either of said complementary lugs and retaining means for the pivot pin including a locking pin, said central lug having an opening formed therein perpendicular to and tangential to the transverse opening therein adapted to receive said locking pin, and said pivot pin having a circumferential groove formed therein to receive said locking pin in either position of said pivot pin.

2. The invention set forth in claim 1, wherein the opening to receive the locking pin is in the central lug, and a circumferential groove is provided at each end of the pivot pin to alternately receive the locking pin when the pivot pin is moved from one of its operating positions to the other.

References Cited in the file of this patent

UNITED STATES PATENTS

| | | |
|---|---|---|
| 128,087 | Wright | June 18, 1872 |
| 859,979 | Sanker | July 16, 1907 |
| 1,360,159 | Wanner | Nov. 23, 1920 |
| 1,815,678 | Rogers | July 21, 1931 |
| 2,032,851 | Page | Mar. 3, 1936 |
| 2,522,951 | Knox | Sept. 19, 1950 |
| 2,610,863 | Null et al. | Sept. 16, 1952 |
| 2,639,160 | Studebaker | May 19, 1953 |

FOREIGN PATENTS

| | | |
|---|---|---|
| 56,734 | France | Oct. 3, 1952 |
| 997,389 | France | Jan. 4, 1952 |
| 431,061 | France | Feb. 23, 1948 |